US012462738B2

(12) United States Patent
Kim et al.

(10) Patent No.: US 12,462,738 B2
(45) Date of Patent: Nov. 4, 2025

(54) DISPLAY DEVICE AND METHOD OF DRIVING DISPLAY DEVICE

(71) Applicant: Samsung Display Co., LTD., Yongin-si (KR)

(72) Inventors: Do Won Kim, Yongin-si (KR); Min Weun Kim, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/810,111

(22) Filed: Aug. 20, 2024

(65) Prior Publication Data

US 2025/0174175 A1 May 29, 2025

(51) Int. Cl.
*G09G 3/32* (2016.01)

(52) U.S. Cl.
CPC ....... *G09G 3/32* (2013.01); *G09G 2320/0233* (2013.01); *G09G 2320/0271* (2013.01); *G09G 2330/028* (2013.01); *G09G 2360/16* (2013.01)

(58) Field of Classification Search
CPC ............. G09G 3/32; G09G 2320/0233; G09G 2320/0271; G09G 2330/028; G09G 2360/16
See application file for complete search history.

(56) References Cited

U.S. PATENT DOCUMENTS

| | | | | |
|---|---|---|---|---|
| 9,159,258 | B2 | 10/2015 | Lee | |
| 11,386,828 | B2 | 7/2022 | Kim et al. | |
| 11,501,721 | B2 | 11/2022 | Yum et al. | |
| 2006/0061593 | A1 | 3/2006 | Miura et al. | |
| 2019/0266952 | A1* | 8/2019 | Pyo | G09G 3/3291 |
| 2021/0110752 | A1* | 4/2021 | Kim | G09G 3/2092 |

FOREIGN PATENT DOCUMENTS

| | | | |
|---|---|---|---|
| KR | 1020060051516 | A | 5/2006 |
| KR | 102090706 | B1 | 3/2020 |
| KR | 1020210043046 | A | 4/2021 |
| KR | 1020210111627 | A | 9/2021 |

* cited by examiner

*Primary Examiner* — David Tung

(74) *Attorney, Agent, or Firm* — CANTOR COLBURN LLP

(57) ABSTRACT

A display panel of a display device includes a pixel, a gamma voltage generator, and a driver. The gamma voltage generator generates gammas voltages. The driver converts a grayscale value of image data into a voltage value, using a gamma lookup table corresponding to an input luminance value, and provides the display panel a data voltage corresponding to a gamma voltage among the gamma voltages, where the data voltage corresponds to the voltage value. The driver selects a first gamma lookup table and a second gamma lookup table from among predetermined gamma lookup tables corresponding to representative luminance values, based on the input luminance value, calculates a third gamma lookup table for the input luminance value by linearly interpolating the first gamma lookup table and the second gamma lookup table, and generates the gamma lookup table based on the third gamma lookup table.

19 Claims, 9 Drawing Sheets

DISPLAY DEVICE AND METHOD OF DRIVING DISPLAY DEVICE

CROSS-REFERENCE TO RELATED APPLICATION

This application claims priority to Korean Patent Application No. No. 10-2023-0165658, filed on Nov. 24, 2023, and all the benefits accruing therefrom under 35 U.S.C. § 119, the content of which in its entirety is herein incorporated by reference

BACKGROUND

1. Technical Field

The present disclosure generally relates to a display device and a method of driving a display device.

2. Description of the Related Art

A display device may include a display panel and a driver. The display panel may include a pixel connected to a scan line and a data line. The driver may include a scan driver which provides a scan signal to the scan line and a data driver which provides a data signal to the data line. The pixel may emit light with a luminance corresponding to the data signal provided through the data line in response to the scan signal provided through the scan line.

The data driver may generate gamma voltages corresponding to all grayscales, and the data driver may output a data signal corresponding to a grayscale value of image data, using the gamma voltages. The maximum luminance of the display panel (or an image) may be adjusted according to a dimming level (or luminance level), and the driver may adjust a grayscale value or adjust a gamma voltage, based on the luminance level.

Due to a limitation of the size of hardware, the data driver may store information (e.g., voltage values) of gamma voltages for only some dimming levels among all dimming levels, and the data driver may generate gamma voltages of a specific dimming level by calculating the information. In some cases, in order to minimize the size of hardware for calculation, the data driver may generate gamma voltages for a specific dimming level by linearly interpolating the information. For example, the data driver may determine a voltage value at a third dimming level by linearly interpolating a voltage value at a first dimming level (e.g., a voltage value of a specific gamma voltage) and a voltage value at a second dimming level, and the data driver may generate a gamma voltage corresponding to the voltage value.

However, for some display devices, the change in voltage value according to dimming level may be nonlinear, and a gamma voltage generated by a data driver at a specific dimming level has an error compared to an ideal gamma voltage. Due to the error, the display devices are unable to display an image with an accurate luminance.

SUMMARY

Embodiments provide a display device and a method of driving a display device, in which an image can be displayed with a more accurate luminance.

In accordance with an aspect of the present disclosure, provided is a display device including: a display panel including a pixel; a gamma voltage generator configured to generate gamma voltages; and a driver. The driver is configured to convert a grayscale value of image data into a voltage value, using a gamma lookup table corresponding to an input luminance value. The driver is configured to provide the display panel with a data voltage corresponding to a gamma voltage among the gamma voltages, wherein the data voltage corresponds to the voltage value. The driver is configured to select a first gamma lookup table and a second gamma lookup table from among predetermined gamma lookup tables corresponding to representative luminance values, based on the input luminance value. The driver is configured to calculate a third gamma lookup table for the input luminance value by linearly interpolating the first gamma lookup table and the second gamma lookup table. The driver is configured to generate the gamma lookup table based on the third gamma lookup table, wherein generating the gamma lookup table includes applying or refraining from applying an offset corresponding to the input luminance value on the third gamma lookup table.

A range of the input luminance value may be divided into a plurality of luminance sections with respect to the representative luminance values. Offsets for first intermediate luminance values included in a first luminance section among the plurality of luminance sections may be predetermined. The driver may calculate the offset by applying the offsets to a second luminance section included among the plurality of luminance sections and to which the input luminance value belongs.

The offsets for the first intermediate luminance values may have a nonlinear relationship with respect to the first intermediate luminance values. The offsets for the first intermediate luminance values may be located on a multidimensional nonlinear curve.

For an intermediate luminance value among the first intermediate luminance values included in the first luminance section, a size of an offset for the intermediate luminance value may increase as a distance between the intermediate luminance value and a boundary of the first luminance section increases.

The driver may be configured to sample the multidimensional nonlinear curve such that a first quantity of the first intermediate luminance values in the first luminance section corresponds to a second quantity of second intermediate luminance values in the second luminance section to which the input luminance value belongs, and the driver may be configured to acquire the offset corresponding to the input luminance value from a sampling result associated with sampling the multidimensional nonlinear curve.

A gain may be predetermined for each luminance section of the plurality of luminance sections. The driver may be configured to correct a height of the multidimensional nonlinear curve, using the gain of the second luminance section to which the input luminance value belongs, and acquire the offset corresponding to the input luminance value by sampling the corrected nonlinear curve.

The gain may further include a sub-gain for each grayscale. The driver may generate the gamma lookup table by applying a sub-offset for each grayscale to a corresponding voltage value in the third gamma lookup table, using the sub-gain.

The driver may be configured to generate the gamma lookup table by adding the offset to a voltage value included in the third gamma lookup table.

The gamma lookup table may include voltage values for a set of grayscale values among all grayscale values. In association with converting the grayscale value into the voltage value, the driver may be configured to calculate voltage values for all the grayscale values by nonlinearly interpolating the voltage values for the set of grayscale values.

The display device may further include an emission driver configured to adjust an emission time parameter of the pixel in a frame, based on whether the input luminance value is in a partial luminance section among the plurality of luminance sections. The driver may be configured to convert the grayscale value into the voltage value, using the gamma lookup table, when the input luminance value is in the partial luminance section, and convert the grayscale value into the voltage value, using the third gamma lookup table, when the input luminance value is out of the partial luminance section.

The driver may be configured to acquire the offset corresponding to the input luminance value, using offsets of the first luminance section among the plurality of luminance sections.

In accordance with another aspect of the present disclosure, a method of driving a display device is provided, the method including: selecting a first gamma lookup table and a second gamma lookup table from among predetermined gamma lookup tables corresponding to representative luminance values as some of all luminance values, based on an input luminance value of a display panel; calculating a third gamma lookup table for the input luminance value by linearly interpolating the first gamma lookup table and the second gamma lookup table; generating a fourth gamma lookup table based on the third gamma lookup table, wherein generating the fourth gamma lookup table includes applying or refraining from applying an offset corresponding to the input luminance value to the third gamma lookup table; converting a grayscale value of image data into a voltage value, using the fourth gamma lookup table; and providing the display panel with a data voltage corresponding to a gamma voltage among gamma voltages generated by a gamma voltage generator, wherein the data voltage corresponds to the voltage value.

A range of the input luminance value may be divided into a plurality of luminance sections with respect to the representative luminance values. Offsets for first intermediate luminance values included in a first luminance section among the plurality of luminance sections may be predetermined. The generating of the fourth gamma lookup table may include calculating the offset by applying the offsets to a second luminance section included among the plurality of luminance sections and to which the input luminance value belongs.

The offsets for the first intermediate luminance values may have a nonlinear relationship with respect to the first intermediate luminance values. The offsets according to the first intermediate luminance values may be located on a multidimensional nonlinear curve.

The calculating of the offset may further include: sampling the multidimensional nonlinear curve such that a first quantity of the first intermediate luminance values in the first luminance section corresponds to a second quantity of second intermediate luminance values in the second luminance section to which the input luminance value belongs; and acquiring the offset corresponding to the input luminance value from a sampling result associated with the sampling of the multidimensional nonlinear curve.

A gain may be predetermined for each luminance section of the plurality of luminance sections. The sampling of the multidimensional nonlinear curve may include correcting a height of the multidimensional nonlinear curve, using the gain of the second luminance section to which the input luminance value belongs. The method may further include acquiring the offset corresponding to the input luminance value by sampling the corrected multidimensional nonlinear curve.

The gain may further include a sub-gain for each grayscale. The generating of the fourth gamma lookup table may further include applying a sub-offset for each grayscale to a corresponding voltage value in the third gamma lookup table, using the sub-gain.

The generating of the fourth gamma lookup table may include adding the offset to a voltage value included in the third gamma lookup table.

The fourth gamma lookup table may include voltage values for a set of grayscale values among all grayscale values. The converting of the grayscale value into the voltage value may include calculating voltage values for all the grayscale values by nonlinearly interpolating the voltage values for the set of grayscale values.

The converting of the grayscale value into the voltage value may include converting the grayscale value into the voltage value, using the fourth gamma lookup table, in response to the input luminance value being smaller than a reference luminance.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, the example embodiments are provided such that the present disclosure will be thorough and complete, and will fully convey the scope of the example embodiments to those skilled in the art.

In the drawing figures, dimensions may be exaggerated for clarity of illustration. It will be understood that when an element is referred to as being "between" two elements, the element can be the only element between the two elements, or one or more intervening elements may also be present. Like reference numerals refer to like elements throughout.

DETAILED DESCRIPTION

Figure 1:
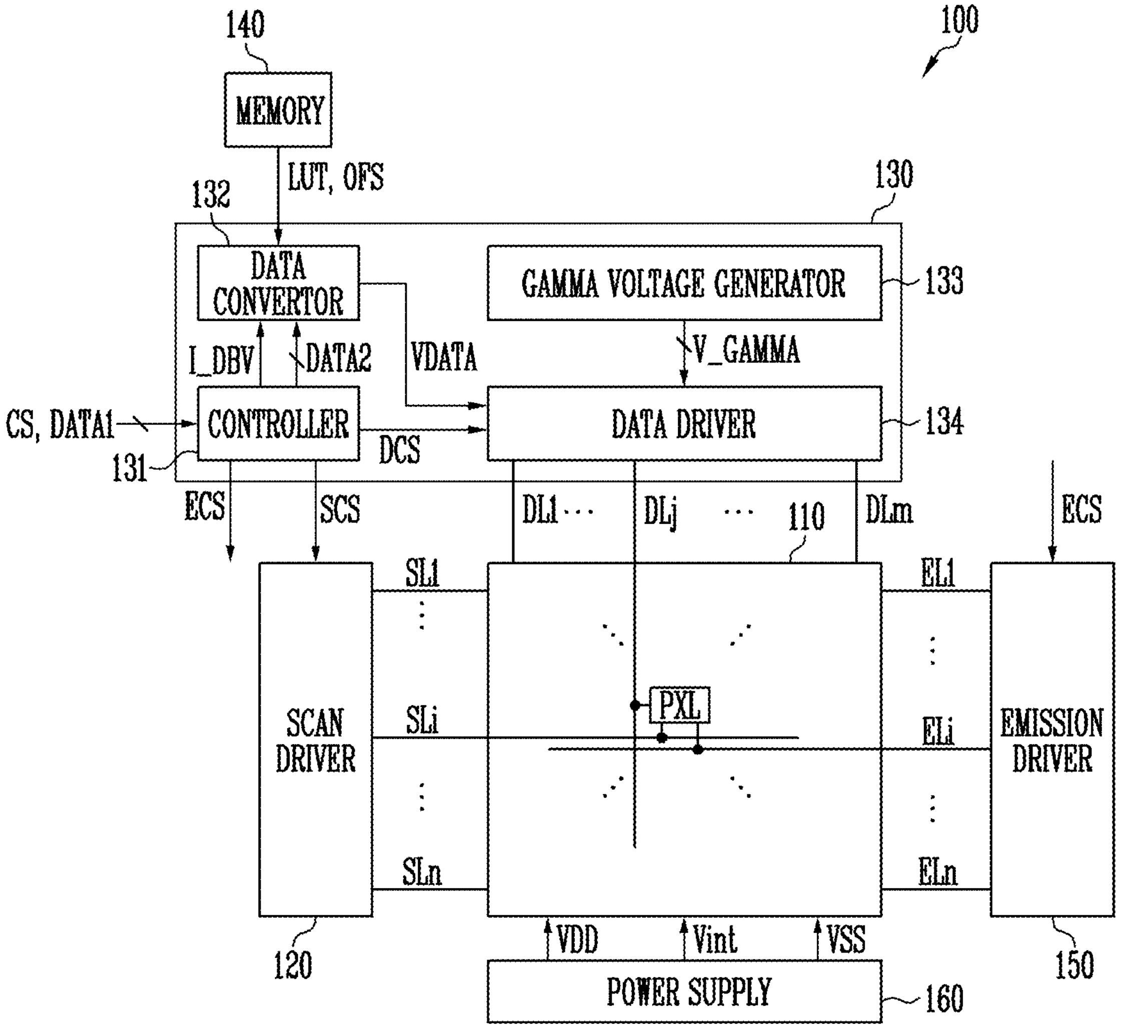
FIG. 1 is a block diagram illustrating a display device in accordance with embodiments of the present disclosure.

The present disclosure may apply various changes and different shape, and embodiments of the present disclosure are not limited to the particular examples described herein. However, the examples are not limited to certain shapes and may be applied to all material variations, equivalents, and replacements supported by aspects of the present disclosure. The drawings included herein are illustrated in a fashion in which the figures are expanded or exaggerated for a better understanding.

It will be understood that, although the terms "first", "second," and the like may be used herein to describe various elements, these elements should not be limited by these terms. These terms are only used to distinguish one element from another element. Thus, a "first" element discussed below could also be termed a "second" element without departing from the teachings of the present disclosure. As used herein, the singular forms are intended to include the plural forms as well, unless the context clearly indicates otherwise.

It will be further understood that the terms "includes" and/or "including," when used in this specification, specify the presence of stated features, integers, steps, operations, elements, and/or components, but do not preclude the presence and/or addition of one or more other features, integers, steps, operations, elements, components, and/or groups thereof.

Some embodiments are described in the accompanying drawings in relation to functional blocks, units, and/or modules. Those skilled in the art will understand that these blocks, units, and/or modules are physically implemented by logic circuits, individual components, microprocessors, hard wire circuits, memory elements, line connection, and other electronic circuits. This may be formed by using semiconductor-based manufacturing techniques or other manufacturing techniques. In the case of blocks, units, and/or modules implemented by microprocessors or other similar hardware, the units, and/or modules are programmed and controlled by using software, to perform various functions discussed in the present disclosure, and may be selectively driven by firmware and/or software. In some aspects, each block, each unit, and/or each module may be implemented by dedicated hardware or by a combination dedicated hardware to perform some functions of the block, the unit, and/or the module and a processor (e.g., one or more programmed microprocessors and associated circuitry) to perform other functions of the block, the unit, and/or the module. In some embodiments, the blocks, the units, and/or the modules may be physically separated into two or more individual blocks, two or more individual units, and/or two or more individual modules without departing from the scope of the present disclosure. In some embodiments, the blocks, the units, and/or the modules may be physically separated into more complex blocks, more complex units, and/or more complex modules without departing from the scope of the present disclosure.

Hereinafter, a display device in accordance with an embodiment of the present disclosure will be described with reference to the accompanying drawings.

FIG. 1 is a block diagram illustrating a display device in accordance with embodiments of the present disclosure.

Referring to FIG. 1, the display device 100 may include a display unit 110 (or display panel), a scan driver 120, a driver 130, a memory 140 (or storage unit), an emission driver 150 (also referred to herein as an emission controller), and a power supply 160.

The display unit 110 may include scan lines SL1 to SLn (where n is a positive integer), data lines DL1 to DLm (where m is a positive integer), emission control lines EL1 to ELn, and pixels PXL. The pixels PXL may be disposed in areas defined by the scan lines SL1 to SLn, the data lines DL1 to DLm, and the emission control lines EL1 to ELn.

A pixel PXL may be connected to at least one of the scan lines SL1 to SLn, one of the data lines DL1 to DLm, and one of the emission control lines EL1 to ELn. For example, a pixel PXL located on an ith row and a jth column may be connected to an ith scan line SLi, a jth data line DLj, and an ith emission control line ELi (each of i and j is a positive integer). The term "connected" herein may refer to an electrical coupling or an electrical connection. The term "connected" may refer to a physical connection supportive of the electrical coupling or electrical connection.

The pixel PXL may store or record a data signal (or data voltage) provided through the jth data line DLj in response to a scan signal provided through the ith scan line SLi. The pixel PXL may emit light with a luminance corresponding to the stored data signal in response to an emission control signal provided through the ith emission control line ELi. The pixel PXL will be described later with reference to FIG. 12.

The scan driver 120 may generate a scan signal, based on a scan control signal SCS, and sequentially provide the scan signal to the scan lines SL1 to SLn. The scan control signal SCS may include a start signal, clock signals, and the like, and be provided from the driver 130. For example, the scan driver 120 may include a shift register which sequentially outputs a scan signal corresponding to the start signal in a pulse form, using the clock signals.

The scan driver 120 may be formed in the display unit 110 through the same process as a process of forming the pixels PXL, or be implemented as a separate integrated circuit.

The emission driver 150 may generate an emission control signal, based on an emission driving control signal ECS, and sequentially or simultaneously provide the emission control signal to the emission control lines EL1 to ELn. The emission driving control signal ECS may include an emission start signal, emission clock signals, and the like, and be provided from the driver 130. For example, the emission driver 150 may include a shift register which sequentially output an emission control signal corresponding to the emission start signal in a pulse form, using the emission clock signals.

The driver 130 may generate data signals, based on input image data DATA1 and a control signal CS, which are provided from the outside (e.g., a graphic processor).

The driver 130 may include a controller 131 (or timing controller), a data convertor 132, a gamma voltage generator 133, and a data driver 134. The controller 131, the data convertor 132, the gamma voltage generator 133, and the data driver 134 may be implemented into one integrated circuit. However, this is merely illustrative, and embodiments of the present disclosure are not limited thereto. For example, the controller 131 may be implemented as one integrated circuit, including the data convertor 132, and the data driver 134 may be implemented as an integrated circuit independent from the controller 131.

The controller 131 may receive the input image data DATA1 and the control signal CS from the outside, generate the scan control signal SCS and a data control signal DCS, based on the control signal CS, and generate image data DATA2 by converting the input image data DATA1. The control signal CS may include a vertical synchronization signal, a horizontal synchronization signal, a clock, and the like. For example, the controller 131 may convert the input image data DATA1 in an RGB format into the image data DATA2 in an RGBG format, corresponding to a pixel arrangement in the display unit 110.

The data convertor 132 may convert an input grayscale value included in the image data DATA2 into a voltage value VDATA, using a lookup table LUT (or gamma lookup table). The lookup table LUT may include the voltage value VDATA corresponding to the input grayscale value, and be provided to the data convertor 132 from the memory 140. The voltage value VDATA may include information on one of gamma voltages V_GAMMA generated by the gamma voltage generator 133. For example, the voltage value VDATA may be a data value of a voltage domain. For example, a relationship between the input grayscale value and the voltage value VDATA may correspond to or accord with a 2.2 gamma curve. The voltage value VDATA will be described later with reference to FIG. 5.

In an embodiment, the data convertor 132 may generate a lookup table (hereinafter, referred to as an "intermediate lookup table") corresponding to an input luminance value I_DBV from the lookup table LUT. In some aspects, the data converter 132 may calculate values for the lookup table ("intermediate lookup table"). A luminance value may be a value indicating a maximum luminance (target luminance, or dimming level) of the display device 100 or an image displayed in the display device 100, and the input luminance value I_DBV (or input dimming value) may mean a luminance value selected from predetermined luminance values. For example, the input luminance value I_DVB may be provided from an external device or the controller 131, or be determined by an input of a user. The terms luminance and brightness may be used interchangeably herein.

In some examples, based on a limitation of the capacity of the memory 140, the lookup table LUT may be predetermined with respect to only some of all luminance values, i.e., representative luminance values. Expressed another way, the lookup table LUT may be predetermined with respect to some of all luminance values, i.e., representative luminance values, for example, such that some luminance values are predetermined and remaining luminance values are calculated as described herein based on the predetermined luminance values. The data convertor 132 may generate a lookup table LUT (e.g., calculate one or more values for the lookup table LUT) corresponding to the input luminance value I_DBV by computing (e.g., interpolation-computing) the lookup table LUT, based on the input luminance value I_DBV. Descriptions of generating a lookup table and calculating a lookup table may be used interchangeably herein.

In an embodiment, the data convertor 132 may calculate an offset for the input luminance value I_DBV, using offsets OFS, and reflect the offset on the intermediate lookup table corresponding to the input luminance value I_DBV. In order to minimize a size of hardware and a computational load, the data convertor 132 may acquire an intermediate lookup table through simple computation (e.g., linear interpolation instead of nonlinear interpolation). The intermediate lookup table may have an error compared to an ideal lookup table (i.e., a lookup table satisfying a condition according to the input luminance value I_DBV). Therefore, in some aspects, the data convertor 132 may compensate for the intermediate lookup table, using the offset. All the luminance values may be divided into luminance sections, based on the representative luminance values, and offsets OFS may be predetermined with respect to only luminance values (hereinafter, referred to as "intermediate luminance values") included in one section among the plurality of luminance sections, which may support minimizing the size of hardware. Expressed another way, some offsets OFS may be predetermined with respect to luminance values (hereinafter, referred to as "intermediate luminance values") included in one section among the plurality of luminance sections, and the techniques described herein include acquiring offsets for some other luminance values based on the predetermined offsets OFS. For example, the data convertor 132 may sample the offsets OFS to be suitable for a luminance section including the input luminance value I_DBV, and acquire an offset for the input luminance value I_DBV from the sampled offsets.

The data convertor 132 may convert the input grayscale value included in the image data DATA2 into the voltage value VDATA, using the compensated intermediate lookup table.

The gamma voltage generator 133 may generate gamma voltages V_GAMMA having a linear relationship. For example, the gamma voltage generator 133 may configured to include a resistor string and gamma buffers which transfer reference gamma voltages to taps (or tap points) of the resistor string. The gamma voltage generator 133 may be implemented as an analog gamma integrated circuit, and therefore, description of a detailed configuration of the gamma voltage generator 133 will be omitted for brevity.

The data driver 134 may generate data signals, based on the data control signal DCS provided from the controller 131, the voltage value VDATA provided from the data converter 132, and the gamma voltages V_GAMMA provided from the gamma voltage generator 133, and provide the data signals to the display unit 110 (or the pixels PXL). The data control signal DCS is a signal for controlling an operation of the data driver 134, and the data control signal DCS may include a load signal (or data enable signal) instructing an output of a valid data signal, and the like.

For example, the data driver 134 may be configured to include a shift register, a latch, a decoder, an output buffer, and the like. The data driver 134 may sequentially provide the voltage value VDATA to the shift register and the latch or temporarily store the voltage value VDATA in the shift register and the latch, based on the data control signal DCS. The data driver 134 may select a gamma voltage corresponding to the voltage value among the gamma voltages V_GAMMA through the decoder. The data driver 134 may output the selected gamma voltage as a data signal (or data voltage) to a data line through the output buffer.

The memory 140 may store the lookup table LUT and the offsets OFS. For example, the memory 140 may be implemented as a flash memory, be mounted on a flexible circuit board on which the driver 130 is mounted, and be connected to the driver 130 (e.g., the data converter 132).

The power supply 160 may supply first and second power voltages VDD and VSS to the display unit 110. The first and second power voltages VDD and VSS may be voltages for operating the pixel PXL (e.g., voltages necessary for an operation of the pixel PXL), and the first power voltage VDD may be a voltage level higher than a voltage level of the second power voltage VSS. In some aspects, the power supply 160 may provide an initialization power voltage Vint to the display unit 110. The initialization power voltage Vint may be provided from the power supply 160 to the display unit 110 through the driver 130 (e.g., the data driver 134).

As described herein, the display device 100 (or the data converter 132) may convert an input grayscale value into a voltage value VDATA on the 2.2 gamma curve, using the lookup table LUT. The display device 100 (or the data converter 132) mays output, as a data signal (or data voltage), a gamma voltage corresponding to the voltage value VDATA among gamma voltages V_GAMMA having the linear relationship. That is, the display device 100 may use a method of converting an input grayscale value into a voltage value VDATA, using a lookup table LUT (or gamma lookup table) including a relationship between a predetermined input grayscale value and a voltage value according to the 2.2 gamma curve (or a method of outputting, as a data signal, a gamma voltage corresponding to the voltage value among linear gamma voltages V_GAMMA). The display device 100 may use the described methods instead of using a method of generating gamma voltages corresponding to the 2.2. gamma curve.

Figure 2:
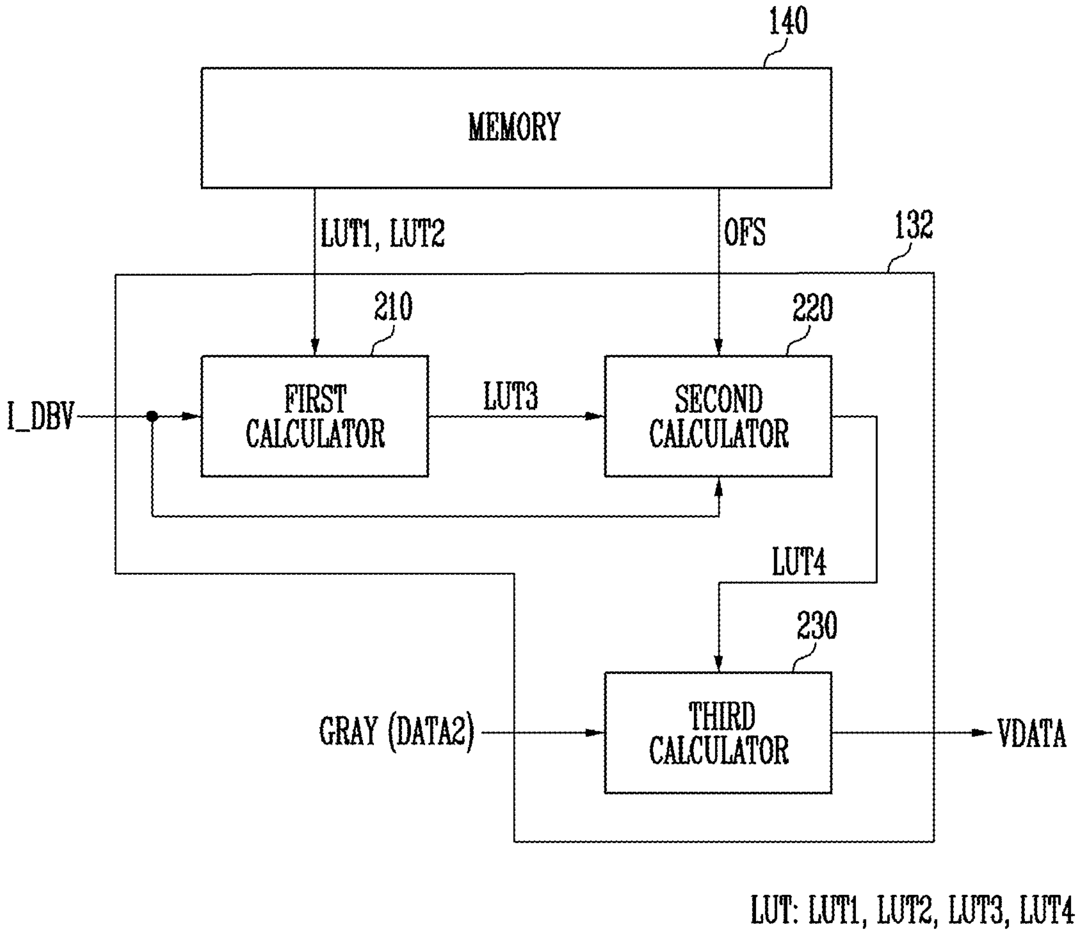
FIG. 2 is a block diagram illustrating an example of a data convertor included in the display device illustrated in FIG. 1.
Figure 3:
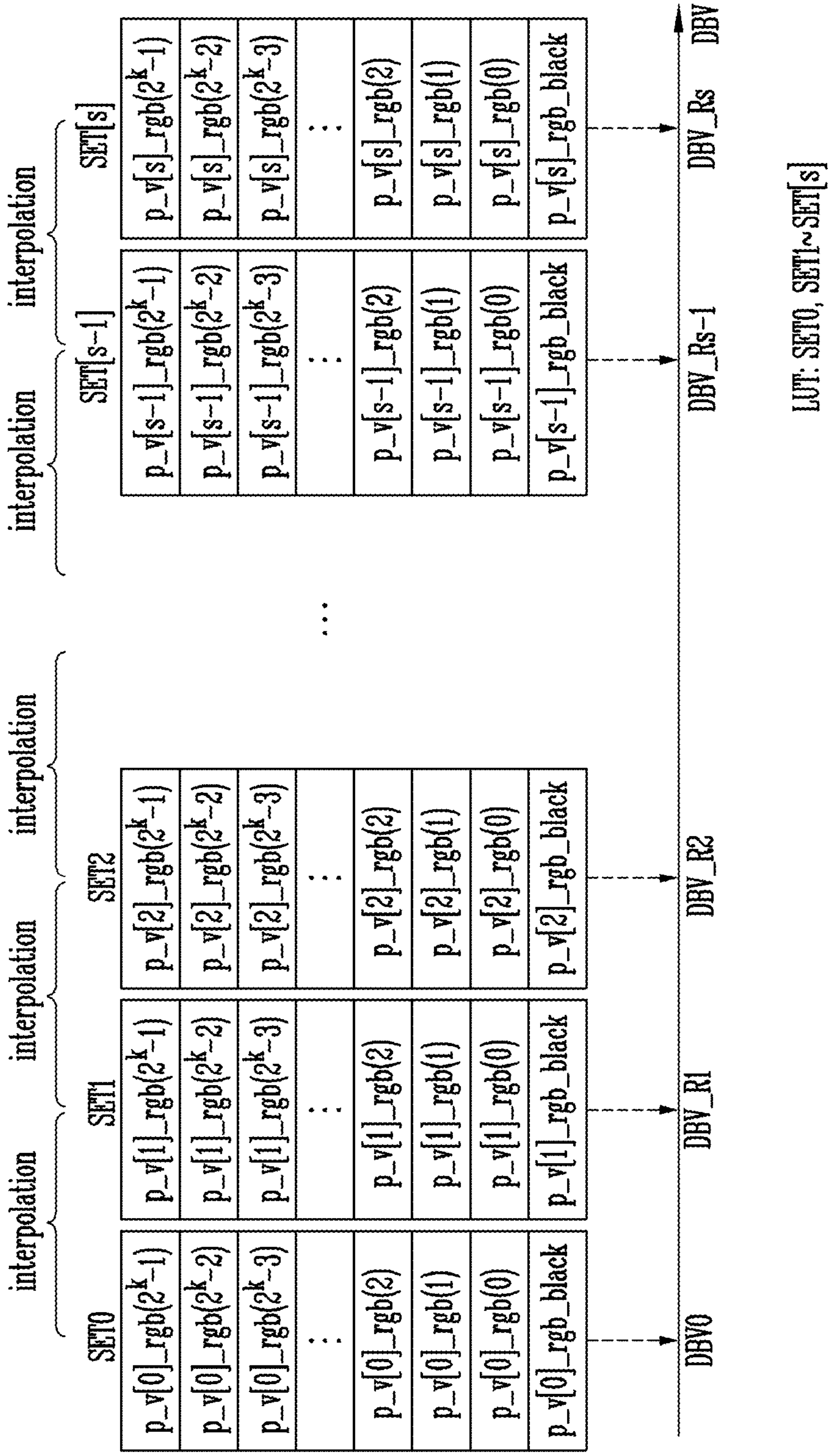
FIG. 3 is a diagram illustrating an example of a lookup table used in the data convertor illustrated in FIG. 2.
Figure 4:
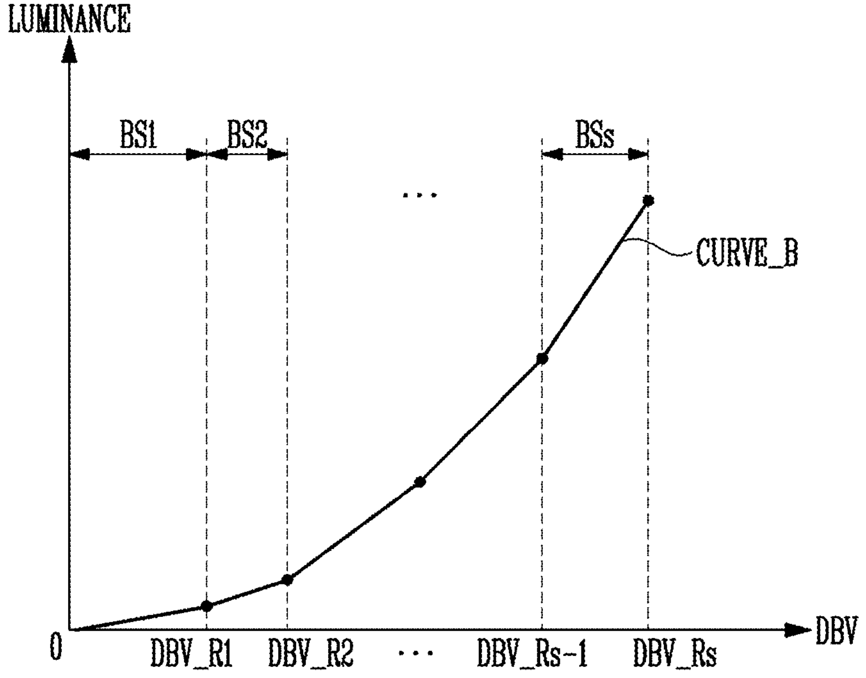
FIG. 4 is a graph illustrating a relationship between luminance values and luminances.
Figure 5:
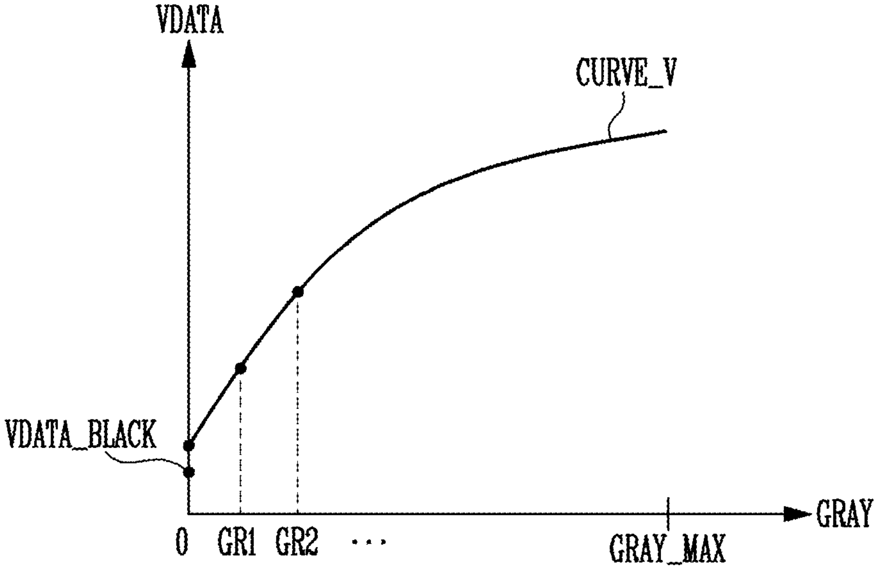
FIG. 5 is a graph illustrating a relationship between grayscale values and voltage values.
Figure 6:
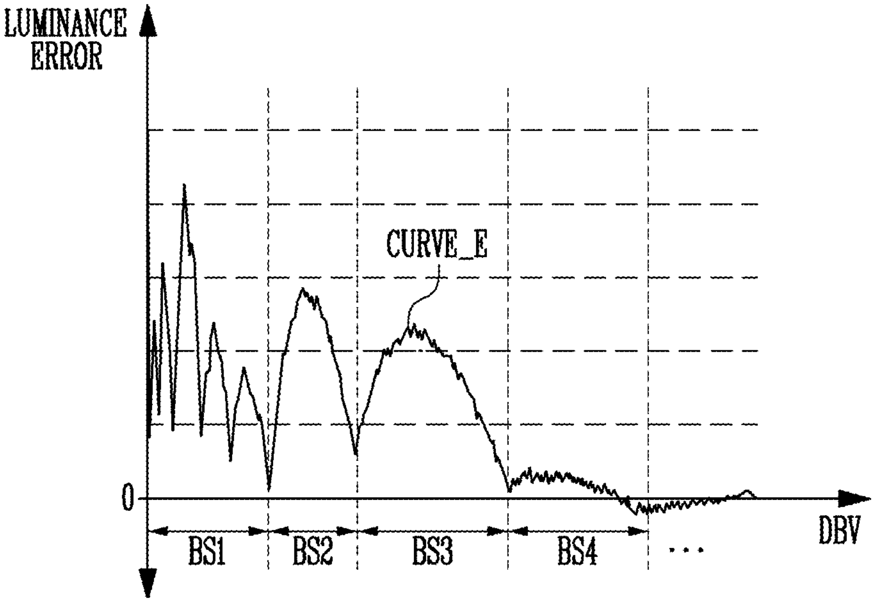
FIG. 6 is a graph illustrating a luminance error of a display device in accordance with a comparative example.

FIG. 2 is a block diagram illustrating an example of the data convertor included in the display device illustrated in FIG. 1. For convenience of description, the memory 140 is further illustrated in FIG. 2. FIG. 3 is a diagram illustrating an example of a lookup table used in the data convertor illustrated in FIG. 2. FIG. 4 is a graph illustrating a relationship between luminance values and representative luminances. FIG. 5 is a graph illustrating a relationship between grayscale values and voltage values. FIG. 6 is a graph illustrating a luminance error of a display device in accordance with a comparative example.

Referring to FIG. 2, the data converter 132 may include a first calculator 210, a second calculator 220, and a third calculator 230.

The first calculator 210 (or the data converter 132) may calculate a third lookup table LUT3 corresponding to an input luminance value I_DBV from a lookup table LUT.

When a lookup table LUT (e.g., third lookup table LUT3) for the input luminance value I_DBV is pre-stored in the memory 140, the data converter 132 may select the lookup table LUT. Alternatively, when the lookup table LUT (e.g., third lookup table LUT3) for the input luminance value I_DBV is not pre-stored in the memory 140, the data converter 132 may calculate the lookup table LUT (e.g., the third lookup table LUT3) from another lookup table LUT as described herein.

In an embodiment, the first calculator 210 may select a first lookup table LUT1 and a second lookup table LUT2 from the lookup table LUT, based on the input luminance value I_DBV, and calculate the third lookup table LUT3 by linearly interpolating the first lookup table LUT1 and the second lookup table LUT2. The first and second lookup tables LUT1 and LUT2 may be representative lookup tables for two representative luminance values adjacent to the input luminance value L_DBV and may be included among predetermined representative lookup tables SET0 and SET1 to SET[s] (see FIG. 3).

Referring to FIG. 3, the lookup table LUT may include representative lookup tables SET0 and SET1 to SET[s] predetermined with respect to representative luminance values DBV0 and DBV_R1 to DBV_Rs. Here, s may be a positive integer. By considering a limitation of the size of the memory 140, the representative lookup tables SET0 and SET1 to SET[s] may be set with respect to only the representative luminance values DBV0 and DBV_R1 to DBV_Rs as some of all luminance values. Expressed another way, the representative lookup tables SET0 and SET1 to SET[s] may be set with respect to the representative luminance values DBV0 and DBV_R1 to DBV, without setting representative lookup tables with respect to representative luminance values different from DBV0 and DBV_R1 to DBV_Rs.

For example, a reference lookup table SET0 may be set corresponding to a reference luminance value DBV0 (e.g., 0 nit). In some embodiments, the reference lookup table SET0 may be omitted. For example, a first representative lookup table SET1 may be set corresponding to a first representative luminance value DBV_R1 (e.g., 17 nits), a second representative lookup table SET2 may set corresponding to a second representative luminance value DBV_R2 (e.g., 68 nits), an (s−1)th representative lookup table SET[s−1] may be set corresponding to an (s−1)th representative luminance value DBV_Rs−1, and an sth representative lookup table SET[s] may be set corresponding to an sth representative luminance value DBV_Rs.

Each of the representative luminance values DBV0 and DBV_R1 to DBV_Rs may an arbitrary luminance value among the luminance values. An example will be described with reference to FIG. 4. A luminance curve CURVE_B representing luminance of the display device 100 according to luminance value DBV may be expressed as a nonlinear curve, and the representative luminance values DBV0 and DBV_R1 to DBV_Rs may correspond to inflection points of the luminance curve CURVE_B. However, embodiments of the present disclosure are not limited thereto. The luminance value DBV (or a range of the input luminance value I_DBV) may be divided into luminance sections BS1 to BSs by the representative luminance values DBV0 and DBV_R1 to DBV_Rs.

Referring back to FIG. 3, the lookup table LUT may include voltage values for at least some of all grayscale values. For example, by considering the limitation of the size of the memory 140, the lookup table LUT may include only voltage values for representative grayscale values 0, GR1, and GR2 as some of all the grayscale values. Expressed another way, the lookup table LUT may include voltage values for representative grayscale values 0, GR1, and GR2 as some of all the grayscale values, without including voltage values for representative grayscale values different from 0, GR1, and GR2, but embodiments of the present disclosure are not limited thereto. In the examples described herein, the term "all grayscale values" may refer to all candidate grayscale values (e.g., 0 to 255) for an image or image data. However, embodiments of the present disclosure are not limited thereto, and in some implementations, the term "all grayscale values" may refer to another predetermined range of candidate grayscale values.

Referring to FIG. 5, a voltage value curve CURVE_V representing voltage value according to grayscale value GRAY may be expressed as a nonlinear curve, and the representative grayscale values 0, GR1, and GR2 may correspond to inflection points of the voltage value curve CURVE_V. However, embodiments of the present disclosure are not limited thereto.

For example, in the sth representative lookup table SET [s], a black voltage value p_v[s]_rgb_black may be a voltage value for a black grayscale value corresponding to a black, a reference voltage value p_v[s]_rgb(0) may be a voltage value for a grayscale value of 0, a first voltage value p_v[s]_rgb(1) may be a voltage value for a first representative grayscale value, a second voltage value p_v[s]_rgb(2) may be a voltage value for a second representative grayscale value, and a $(2^k-1)$th voltage value p_v[s]_rgb(k) may be a voltage value for a $(2^k-1)$th representative grayscale value. Voltage values of the representative lookup tables SET0 and SET1 to SET[s] are the same as illustrated in FIG. 3, and therefore, descriptions of the voltage values will be omitted.

In an embodiment, the first calculator 210 may primarily calculate a lookup table for a luminance value (or intermediate luminance value) between the representative luminance values DBV0 and DBV_R1 to DBV_Rs by interpolating the representative lookup tables SET0 and SET1 to SET[s]. For simplification of the calculation, the first calculator 210 may calculate the lookup table for the luminance value by linearly interpolating the representative lookup tables SET0 and SET1 to SET[s].

For example, the first calculator 210 may calculate a lookup table between the first representative luminance value DBV_R1 and the second representative luminance value DBV_R2 by linearly interpolating the first representative lookup table SET1 and the second representative lookup table SET2. For example, the first calculator 210 may calculate a first voltage of the lookup table for the luminance value by linearly interpolating a first voltage value p_v[1]_rgb(1) of the first representative lookup table SET1 and a first voltage value p_v[2]_rgb(1). In this manner, embodiments of the present disclosure support calculating each voltage value in the lookup table for the luminance value.

However, in some cases, since the change in an ideal luminance of the display device 100 according to the luminance value DBV is not linear, an error may occur between an actual luminance of a display device using only linear interpolation and the ideal luminance of the display device 100.

A comparative example will be described with reference to FIG. 6. An error curve CURVE_E represents luminance error of the display device using only the linear interpolation (or converting a grayscale value into a voltage value, using the third lookup table LUT3). The luminance error is 0 or is close to 0 at boundaries of luminance sections BS1 to BS4, but may increase as the luminance value DBV becomes more distant from the boundaries of the plurality of luminance sections BS1 to BS4. Therefore, the data converter 132 in accordance with the embodiments of the present disclosure may compensate for the third lookup table LUT3 such that a total luminance error is decreased.

Referring back to FIG. 2, the second calculator 220 may generate a fourth lookup table LUT4 by reflecting an offset OFS corresponding to the input luminance value I_DBV on the third lookup table LUT3. Expressed another way, in some examples, the second calculator 220 may generate the fourth lookup table LUT4 by applying the offset OFS corresponding to the input luminance value I_DBV to the third lookup table LUT3.

In an embodiment, offsets for luminance values included in one luminance section among the plurality of luminance sections BS1 to BS4 (see FIG. 6) may be predetermined, and the second calculator 220 may calculate an offset for the input luminance value I_DBV by applying offsets for luminance values included in a luminance section to which the input luminance value I_DBV belongs. That is, embodiments of the present disclosure support setting offsets with respect to only some of the plurality of luminance sections BS1 to BS4 (see FIG. 6) (e.g., without setting offsets for other luminance sections in addition to for luminance sections BS1 to BS4), which may support minimizing the size of hardware, and calculating offsets for the other luminance sections using the offsets which are already set. Hereinafter, for convenience of description, the luminance section in which the offsets are set (i.e., a luminance section or a reference luminance section, which is used a reference in association with setting the offsets for the other luminance sections) will be referred to as a first section, and the luminance section to which the input luminance value I_DBV belongs (i.e., a luminance section or a target luminance section, in which the offset is to be calculated) will be referred to as a second section. In some aspects, luminance values included in the first section will be referred to as first intermediate luminance values.

A configuration of calculating an offset of the first section, a configuration of calculating an offset of the second section, and a configuration of generating the fourth lookup table, using the offsets will be described later with reference to FIGS. 7 to 10.

The third calculator 230 may convert a grayscale value GRAY of image data DATA2 into a voltage value VDATA, using the fourth lookup table LUT4. For example, the third calculator 230 may output a voltage value VDATA of the fourth lookup table LUT4, which corresponds to the grayscale value GRAY of the image data DATA2.

Figure 7:
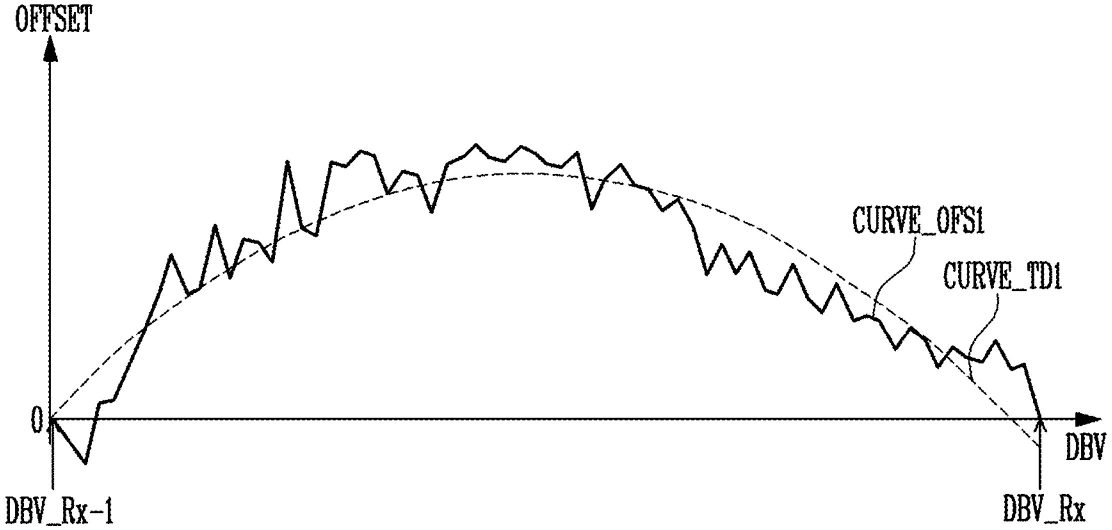
FIGS. 7 and 8 are graphs illustrating an embodiment of an offset.
Figure 8:
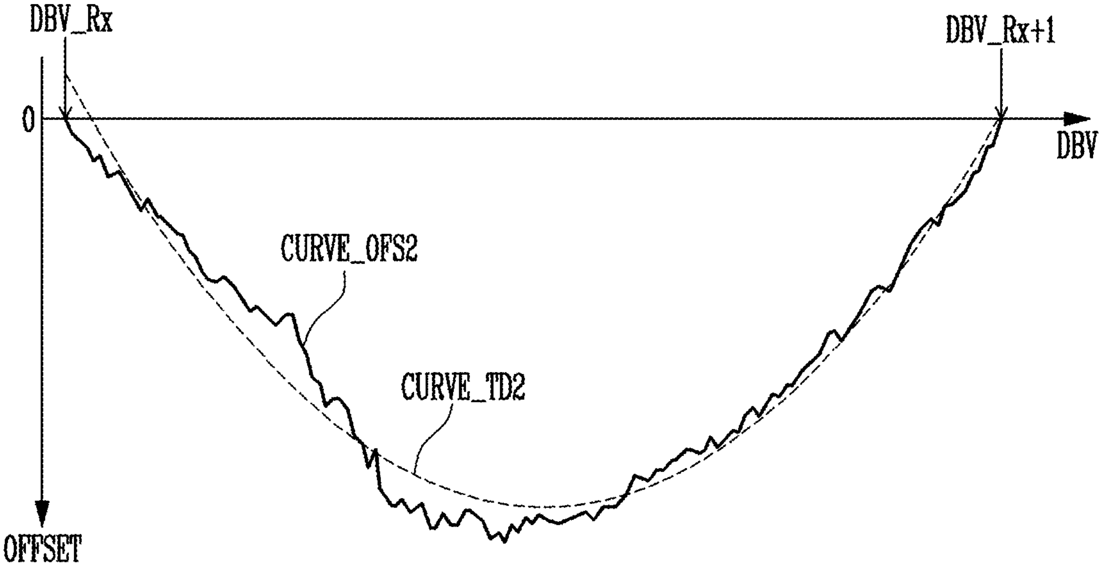

FIGS. 7 and 8 are graphs illustrating an embodiment of an offset.

Referring to FIG. 7, a first offset curve CURVE_OFS1 may represent offsets according to luminance value DBV in an xth luminance section. For example, the first offset curve CURVE_OFS1 may represent offsets for an (x−1)th representative luminance value DBV_Rx−1 to an xth representative luminance value DBV_Rx. In an example in which the (x−1)th representative luminance value DBV_Rx−1 is 68 and the xth representative luminance value DBV_Rx is 136, the first offset curve CURVE_OFS1 may represent offsets for luminance values of 68 to 136. An offset may have a nonlinear relationship with respect to the luminance value DBV, the offsets according to the luminance value DBV may be located on the first offset curve CURVE_OFS1, and the first offset curve CURVE_OFS1 may be expressed as a multidimensional nonlinear curve (also referred to herein as a two or more-dimensional nonlinear curve). The offsets according to the first offset curve CURVE_OFS1 may have positive values, but embodiments of the present disclosure are not limited thereto.

Embodiments of the present disclosure support experimentally deriving the first offset curve CURVE_OFS1 and other offset curves (e.g., other offset curves described herein, and the like). For example, the first offset curve CURVE_OFS1 or the offsets may be derived through a multi-time programming (MTP) process. For example, embodiments of the present disclosure support deriving the first offset curve CURVE_OFS1 or the offsets by repeating a process of adjusting a voltage value corresponding to an arbitrary grayscale (e.g., a maximum grayscale or a white grayscale) while measuring a luminance of an image displayed in the display device 100 (see FIG. 1). Each offset may be a difference between a measurement value (i.e., a voltage value acquired through measurement) and a linear computation value (i.e., a voltage value calculated through linear computation).

Embodiments of the present disclosure support calculating an offset for each luminance value DBV through nonlinear computation using a first two-dimensional curve CURVE_TD1 similar to the first offset curve CURVE_OFS1. However, embodiments of the present disclosure are not limited thereto, and the techniques described herein support adding hardware for nonlinear computation between lookup tables (i.e., nonlinear computation, e.g., two-dimensional computation instead of linear computation), increasing the size of the hardware, or both. Thus, the data converter 132 (see FIG. 2) in accordance with the embodiments of the present disclosure uses offsets instead of the nonlinear computation, which supports minimizing or reducing the size of the hardware.

Referring to FIG. 8, a second offset curve CURVE_OFS2 may represent offsets according to luminance value DBV in an (x+1)th luminance section. For example, the second offset curve CURVE_OFS2 may represent offsets for the xth representative luminance value DBV_Rx to an (x+1)th representative luminance value DBV_Rx+1. In an example in which the xth representative luminance value DBV_Rx is 136 and the (x+1)th representative luminance value DBV_Rx+1 is 273, the second offset curve CURVE_OFS2 may represent offsets for luminance values of 136 to 273. The second offset curve CURVE_OFS2 may be expressed as a multidimensional nonlinear curve (also referred to herein as a two or more-dimensional nonlinear curve). The offsets according to the second offset curve CURVE_OFS2 may have roughly negative values, but embodiments of the present disclosure are not limited thereto. The second offset curve CURVE_OFS2 may be similar to a second two-dimensional curve CURVE_TD2.

The first offset curve CURVE_OFS1 (or the first two-dimensional curve CURVE_TD1) illustrated in FIG. 7 and the second offset curve CURVE_OFS2 (or the second two-dimensional curve CURVE_TD2) illustrated in FIG. 8 have different width and different heights, but may have shapes identical or similar to each other.

Therefore, the data converter 132 (see FIG. 2) in accordance with the embodiments of the present disclosure may store one of the first offset curve CURVE_OFS1 (or the first two-dimensional curve CURVE_TD1) and the second offset curve CURVE_OFS2 (or the second two-dimensional curve CURVE_TD2), without storing the other of the first offset curve CURVE_OFS1 and the second offset curve CURVE_OFS2.

TABLE 1

| DBV | Offset Value |
|---|---|
| DBV_M1 | V_OFS1 |
| DBV_M2 | V_OFS2 |
| . . . | . . . |
| DBV_My-1 | V_OFSy-1 |
| DBV_My | V_OFSy |

Table 1 illustrates an embodiment of an offset lookup table.

The offset lookup table may include offsets of intermediate luminance values DBV_M1 to DBV_My or offset values V_OFS1 to VOFSy in the first section. Here, y is a positive integer. For example, as an intermediate luminance value becomes distant from a boundary of a first luminance section, the size of an offset for the intermediate luminance value may become larger. The offset values V_OFS1 to VOFSy may be voltage values (or values of a voltage domain), but embodiments of the present disclosure are not limited thereto.

For example, the intermediate luminance values DBV_M1 to DBV_My may be the (x−1)th representative luminance value DBV_Rx−1 to the xth representative luminance value DBV_Rx, and the offset values V_OFS1 to VOFSy may be the offset values according to the first offset curve CURVE_OFS1. For more accurate compensation, the offsets according to the first offset curve CURVE_OFS1 (or the offsets according to the second offset curve CURVE_OFS2) may be stored (e.g., pre-stored). However, embodiments of the present disclosure are not limited thereto. For example, the offsets according to the first two-dimensional curve CURVE_TD1 or the offsets according to the second two-dimensional curve CURVE_TD2 may be stored as the offset values V_OFS1 to VOFSy. Thus, an error deviation for each luminance section can be minimized.

Figure 9:
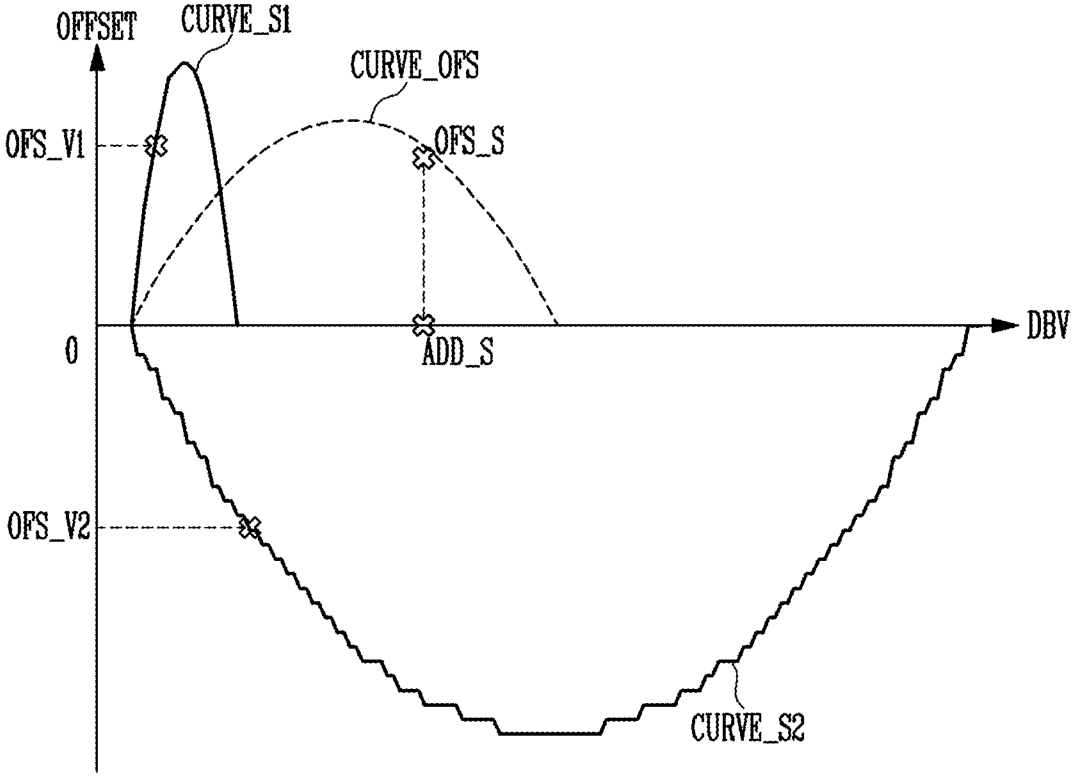
FIG. 9 is a diagram illustrating an operation in which the data convertor illustrated in FIG. 2 samples an offset.

FIG. 9 is a diagram illustrating an operation in which the data convertor illustrated in FIG. 2 samples an offset.

Referring to FIGS. 2 and 9, the data converter 132 or the second calculator 220 may sample the multidimensional nonlinear curve such that a first quantity of first intermediate luminance values in the first section corresponds to a second quantity of second intermediate luminance values in the second section to which an input luminance value I_DBV belongs, and the data converter 132 or the second calculator 220 may acquire an offset for the input luminance value I_DBV from a sampling result.

An offset curve CURVE_OFS (or reference curve) may represent offsets predetermined according to luminance value DBV. For example, the offset curve CURVE_OFS may be the first offset curve CURVE_OFS1 or the first two-dimensional curve CURVE_TD1, which is illustrated in FIG. 7. For example, the first intermediate luminance values may be luminance values of 68 to 136, and the quantity of the first intermediate luminance values may be 68.

For example, the input luminance value I_DVB may be 10 and may belong to a luminance section including luminance values of 4 to 17. The second calculator 220 may sample the offset curve CURVE_OFS such that the quantity (e.g., 68) of the first intermediate luminance values in the first section corresponds to the quantity (e.g., 14) of the second intermediate luminance values in the second section. For example, the second calculator 220 may sample a value OFS_S of the offset curve CURVE_OFS with respect to a sampling address ADD_S corresponding to the second intermediate luminance values. For example, the second calculator 220 may set the sampling address ADD_S for the input luminance value I_DBV in a manner that allows the quantity (e.g., 68) of the first intermediate luminance values in the first section to correspond to the quantity (e.g., 14) of the second intermediate luminance values in the second section, and the second calculator 220 may sample the value OFS_S of the offset curve CURVE_OFS with respect to the sampling address ADD_S.

In another example, the input luminance value I_DVB may be 160 and may belong to a luminance section including luminance values of 136 to 273. The second calculator 220 may sample the offset curve CURVE_OFS such that the quantity (e.g., 68) of the first intermediate luminance values in the first section corresponds to the quantity (e.g., 138) of the second intermediate luminance values in the second section.

In an embodiment, the second calculator 220 may correct a height of the offset curve CURVE_OFS (or nonlinear curve), using a gain set with respect to the second section, and acquire an offset by sampling the corrected offset curve. The gain may be a predetermined value for each luminance section or for each representative luminance value. Since a luminance error for each luminance section varies (see FIG. 6), the offset curve CURVE_OFS (or the offset) may Table 2

| Section of DBV (or DBV) | Gain Value |
|---|---|
| BS1 (DBV_R1) | G1 |
| BS2 (DBV_R2) | G2 |
| . . . | . . . |
| BSs (DBV_Rs) | Gs |

Table 2 illustrates an embodiment of the gain for each luminance section.

For example, a first gain G1 may be set with respect to a first luminance section BS1 (or a first representative luminance value DRV_R1), a second gain G2 may be set with respect to a second luminance section BS2 (or a second representative luminance value DRV_R2), and an sth gain Gs may be set with respect to an sth luminance section BSs (or an sth representative luminance value DRV_Rs).

In an example in which the input luminance value I_DBV belongs to the second luminance section BS2, the second calculator 220 may correct the height of the offset curve CURVE_OFS, using the second gain G2, and derive a first sampling curve CURVE_S1 by sampling the corrected offset curve. The second calculator 220 may acquire a first offset value OFS_V1 corresponding to the input luminance value I_DBV from the first sampling curve CURVE_S1.

In another example, when the input luminance value I_DBV belongs to the sth luminance section BSs, the second calculator 220 may correct the height of the offset curve CURVE_OFS, using the sth gain G2, and derive a second sampling curve CURVE_S2 by sampling the corrected offset curve. The second calculator 220 may acquire a second offset value OFS_V2 corresponding to the input luminance value I_DBV from the second sampling curve CURVE_S2.

Although it is described that the second calculator 220 corrects the height of the offset curve CURVE_OFS, using the gain, and then samples the corrected offset curve, embodiments of the present disclosure are not limited thereto. For example, the second calculator 220 may sample the offset curve CUVRE_OFS and then correct an offset value, using the gain.

In an embodiment, the second calculator 220 may generate the fourth lookup table LUT4 by adding an offset (i.e., an offset value acquired through sampling) to a voltage value of the third lookup table LUT3.

In some embodiments, the second calculator 220 may calculate a sub-offset for each grayscale, using a sub-gain set for each grayscale, and generate the fourth lookup table LUT4 by applying the sub-offset to a corresponding voltage value in the third lookup table LUT3.

TABLE 3

| Grayscale | Gain Value |
|---|---|
| GRAY_R1 | G_S1 |
| GRAY_R2 | G_S2 |
| . . . | . . . |
| GRAY_Rk | G_Sk |

Table 3 illustrates an embodiment of the sub-gain (or gain) for each grayscale.

For example, a first sub-gain G_S1 may be set with respect to a first representative grayscale value GRAY_R1, a second sub-gain G_S2 may be set with respect to a second representative grayscale value GRAY_R2, and a kth sub-gain G_Sk may be set with respect to a kth representative grayscale value GRAY_Rk.

For example, the second calculator 220 may calculate each of sub-offsets with respect to representative grayscale values GRAY_R1 to GRAY_Rk by applying the offset calculated through the operation illustrated in FIG. 9 to Table 3. After that, the second calculator 220 may calculate the fourth lookup table LUT4 by adding the sub-offsets respectively to voltage values in the third lookup table LUT3 (e.g., values corresponding to voltage values in a third representative lookup table SET3 illustrated in FIG. 3).

In an embodiment, when the input luminance value I_DBV is included in the reference luminance section, the second calculator 220 (or the data converter 132) may generate the fourth lookup table LUT4 by correcting the third lookup table LUT3, using the offset. When the input luminance value I_DBV is out of the reference luminance section, the second calculator 220 may output the third lookup table LUT3 as the fourth lookup table LUT4. That is, the second calculator 220 may bypass the third lookup table LUT3. For example, the display device 100 may vary only a data voltage in an intermediate luminance section or more (e.g., a luminance section exceeding 100 nits), and the display device 100 may vary an emission duty cycle in addition to the varying of the data voltage in a low luminance section (e.g., a luminance section of 100 nits or less) (also referred to herein as a partial luminance section). Expressed another way, the display device 100 may vary a data voltage (without varying emission duty cycle) in luminance sections having a luminance higher than a threshold luminance value (e.g., luminance sections exceeding 100 nits), and the display device 100 may vary a data voltage and an emission duty cycle for luminance sections having a luminance equal to or less than the threshold luminance value (e.g., luminance sections of 100 nits or less) (also referred to herein as a partial luminance sections). For example, the emission driver 150 (see FIG. 1) may adjust an emission time parameter associated with the pixel, based on a pulse width of the emission start signal. Non-limiting examples of the emission time parameter include emission start time, emission end time, emission duration, emission duty cycle, and the like. In an example, the emission driver 150 (see FIG. 1) may adjust an emission time period associated with the pixel, based on the pulse width of the emission start signal.

In some aspects, the emission driver 150 may determine whether the input luminance value I_DBV is included in the reference luminance section or out of the reference luminance section.

In the low luminance section, a current flowing through the pixel is small (e.g., below a threshold current), and hence it may be difficult to accurately express a luminance. Therefore, the data voltage may be increased, and the emission duty cycle may be decreased. However, a large luminance error may occur as both the emission duty cycle and the data voltage (a gamma voltage and a voltage value, which correspond thereto) are adjusted. An example will be described with reference to FIG. 6. The luminance error may be large (e.g., be above a threshold error value) in first, second, and third luminance sections BS1, BS2, and BS3 and may not be large (e.g., be less than or equal to the threshold error value) in a fourth luminance section BS4 or more. Expressed another way, the luminance error may be relatively small (e.g., be less than or equal to the threshold error value) in the fourth luminance section BS4 and luminance sections (e.g., a fifth luminance section BS5, a sixth luminance section BS6, and the like) (not illustrated) subsequent to the fourth luminance section BS4. In some examples, the luminance error may not be visible by a user.

Therefore, the second calculator 220 may compensate for the third lookup table LUT3 in only the reference luminance section (e.g., the low luminance section) in which the input luminance value I_DBV is smaller than or equal to a reference luminance (also referred to herein as a reference luminance value), and may refrain from compensating for the third lookup table LUT3 when the input luminance value I_DBV is greater than the reference luminance. For example, the second calculator 220 may refrain from compensating for the third lookup table LUT3 for luminance sections (e.g., high luminance sections) in which the input luminance value I_DBV is greater than the reference luminance. A compensation process of the second calculator 220 may be selectively used, and the load of the data converter 132 may be decreased. However, embodiments of the present disclosure are not limited thereto. For example, the second calculator 220 may compensate for the third lookup table LUT3, using the offset, in all the luminance sections, regardless of whether the input luminance value I_DBV is smaller than the reference luminance. The luminance error in the other luminance sections except the reference luminance section may be further decreased.

Although it has been described that the second calculator 220 compensates for the third lookup table LUT3, based on determining that the input luminance value I_DBV is included in the reference luminance section (or that the input luminance value I_DBV is smaller than the reference luminance), embodiments of the present disclosure are not limited thereto. For example, the second calculator 220 may output the fourth lookup table LUT4 by compensating for the third lookup table LUT3, and the third calculator 230 may selectively use the third lookup table LUT3 or the fourth lookup table LUT4, based on the input luminance value I_DBV.

In an embodiment, even when the display device 100 operates in a low power mode, the second calculator 220 may output the third lookup table LUT3 as the fourth lookup table LUT4. That is, in the low power mode, the second calculator 220 does not substantially operate, and power associated with an operation for compensating for the third lookup table LUT3 may not be consumed. A signal related to the low power mode may be provided to the data converter 132 from an external device or the controller 131. The term "substantially," as used herein, means approximately or actually. The term "does not substantially operate," as used herein, means refraining from performing one or more operations and/or performing one or more operations according to a reduced performance level.

In an embodiment, the fourth lookup table LUT4 may include voltage values for representative grayscale values as some grayscale values among all grayscale values, and the second calculator 220 may calculate voltage values for all the grayscale values by nonlinearly interpolating the voltage values for the representative grayscale values.

Figure 10:
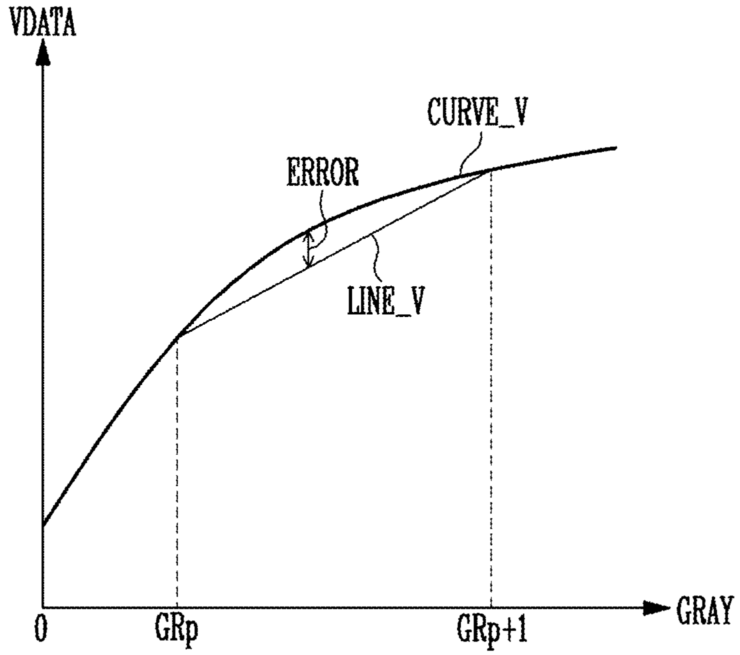
FIG. 10 is a graph illustrating a relationship between grayscale values and voltage values.

FIG. 10 is a graph illustrating a relationship between grayscale values and voltage values.

Referring to FIG. 10, the fourth lookup table LUT4 may include a voltage value for a pth representative grayscale value GRp and a voltage value for a (p+1)th representative grayscale value GRp+1. Here, p is a positive integer.

When the voltage value for the pth representative grayscale value GRp and the voltage value for the (p+1)th representative grayscale value GRp+1 are linearly interpolated, voltage values for grayscale values between the pth representative grayscale value GRp and the (p+1)th representative grayscale value GRp+1 may be located on a first line LINE_V. The first line LINE_V may have an error ERROR with a voltage value curve CURVE_V (i.e., a curve including ideal voltage values). Therefore, the second calculator 220 in accordance with the embodiments of the present disclosure may calculate the voltage values for the grayscale values between the pth representative grayscale value GRp and the (p+1)th representative grayscale value GRp+1 by nonlinearly interpolating the voltage value for the pth representative grayscale value GRp and the voltage value for the (p+1)th representative grayscale value GRp+1. In this manner, the second calculator 220 may calculate voltage values for all grayscale values, allowing the voltage values for all the grayscale values to be included in the fourth lookup table LUT4.

In an embodiment, when the error ERROR according to grayscale value GRAY is expressed as a two-dimensional curve, the second calculator 220 may use a two-dimensional computation corresponding to the two-dimensional curve.

In another embodiment, the second calculator 220 may apply the correction using the offset described with reference to FIGS. 7 to 9 to a configuration of calculating a voltage for each grayscale. For example, grayscale offsets for the grayscale values between the pth representative grayscale value GRp and the (p+1)th representative grayscale value GRp+1 may be predetermined, and the second calculator 220 may calculate the voltage values for all the grayscale values by compensating for a linear interpolation result (i.e., voltage values on the first line LINE_V), using the grayscale offsets.

As described with reference to FIGS. 2 to 10, the data converter 132 may generate the third lookup table LUT3 by linearly interpolating the first and second lookup tables LUT1 and LUT2 predetermined with respect to two luminance values adjacent to the input luminance value I_DBV. The data converter 132 may calculate an offset for the input luminance value I_DBV by sampling offsets predetermined with respect to a specific luminance section, based on the input luminance value I_DBV, and compensate for the third lookup table LUT3, using the offset. The data converter 132 may convert the input grayscale value into a data voltage (or gamma voltage value), based on the compensated third lookup table LUT3 (i.e., the fourth lookup table LUT4). Thus, as compared with when a data voltage is calculated using the third lookup table LUT3, the data converter 132 can generate a more accurate data value (or gamma voltages according thereto) corresponding to the input luminance value I_DBV, and the display quality of the display device 100 (see FIG. 1) including the data converter 132 can be improved.

Figure 11:
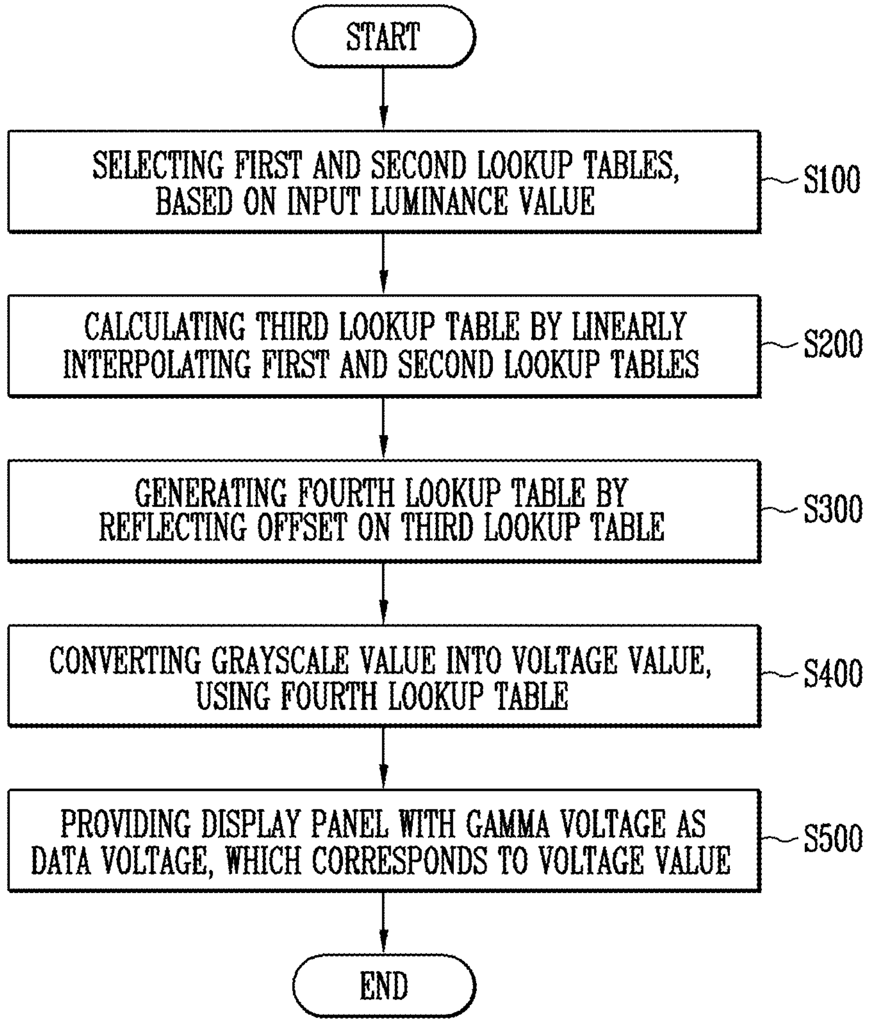
FIG. 11 is a flowchart illustrating a method of driving a display device in accordance with embodiments of the present disclosure.

FIG. 11 is a flowchart illustrating a method of driving a display device in accordance with embodiments of the present disclosure.

In the descriptions of the method and processes herein, the operations may be performed in a different order than the order shown and/or described, or the operations may be performed in different orders or at different times. Certain operations may also be left out of the method and processes, one or more operations may be repeated, or other operations may be added. Descriptions associated with an operation in which an element "may be selected," "may be calculated," "may be generated," "may be converted," "may be provided," and the like include methods, processes, and techniques for the like in accordance with example aspects described herein.

Referring to FIGS. 1, 2, and 11, the method illustrated in FIG. 11 may be performed in the display device 100 illustrated in FIG. 1.

In the method illustrated in FIG. 11, the method may include selecting a first lookup LUT1 and a second lookup table LUT2 from among predetermined lookup tables LUT (or gamma lookup tables) corresponding to representative luminance values as some of all luminance values, based on an input luminance value I_DBV (S100).

As described with reference to FIGS. 2 and 3, the method may include selecting representative lookup tables for two representative luminance values adjacent to the input luminance value I_DBV among the predetermined representative lookup tables SET0 and SET1 to SET[s] (see FIG. 3).

In the method illustrated in FIG. 11, the method may include calculating a third lookup table LUT3 for the input luminance value I_DBV by linearly interpolating the first lookup table LUT1 and the second lookup table LUT2 (S200).

In the method illustrated in FIG. 11, the method may include generating a fourth lookup table LUT4 by reflecting an offset corresponding to the input luminance value I_DBV on the third lookup table LUT3 (S300). For example, at S300, the method may include generating the fourth gamma lookup table LUT4 based on the third gamma lookup table LUT3, wherein generating the fourth gamma lookup table LUT4 includes applying or refraining from applying an offset corresponding to the input luminance value I_DBV to the third gamma lookup table LUT3.

In an embodiment, (not illustrated), as described with reference to FIGS. 7 to 9, in the method illustrated in FIG. 11, the method may include calculating a voltage value of the fourth lookup table LUT4 by sampling predetermined offsets for the purpose of luminance values in a first section, calculating an offset for the input luminance value I_DBV, and adding the offset to a voltage value of the third lookup table LUT3.

In an embodiment, (not illustrated), as described with reference to FIG. 9, in the method illustrated in FIG. 11, the method may include calculating an offset by correcting offsets (or a height of an offset curve) in the first section, using a gain predetermined with respect to a second section to which the input luminance value I_DBV belongs, and sampling the corrected offsets.

In an embodiment, (not illustrated), as described with reference to Table 3, in the method illustrated in FIG. 11, the method may include calculating a sub-offset for each grayscale by applying a sub-gain predetermined for each grayscale to the offset, and the method may include calculating a voltage value for each grayscale in the fourth lookup table LUT4 by applying the sub-offset to a voltage value for each grayscale in the third lookup table LUT3.

In an embodiment, (not illustrated), as described with reference to FIG. 10, when the fourth lookup table LUT4 includes only voltage values for representative grayscale values, in the method illustrated in FIG. 11, the method may include calculating voltage values for all grayscale values by nonlinearly interpolating the voltage values.

In an embodiment, (not illustrated), in the method illustrated in FIG. 11, the method may include compensating the third lookup table LUT3 based on determining that the input luminance value I_DBV is included in a reference luminance section (or that the input luminance value I_DBV is smaller than a reference luminance).

In the method illustrated in FIG. 11, the method may include converting a grayscale value GRAY of image data DATA2 into a voltage value VDATA, using the fourth lookup table LUT (S400).

In an embodiment, as described herein, in the method illustrated in FIG. 11, the method may include converting the grayscale value GRAY into the voltage value VDATA, using the fourth lookup table LUT4, based on determining that the input luminance value I_DBV is included in the reference luminance section (or that the input luminance value I_DBV is smaller than the reference luminance).

In the method illustrated in FIG. 11, the method may include providing a gamma voltage corresponding to the voltage value VDATA from among gamma voltages V_GAMMA generated by the gamma voltage generator 133 as a data voltage to the display panel (S500).

Figure 12:
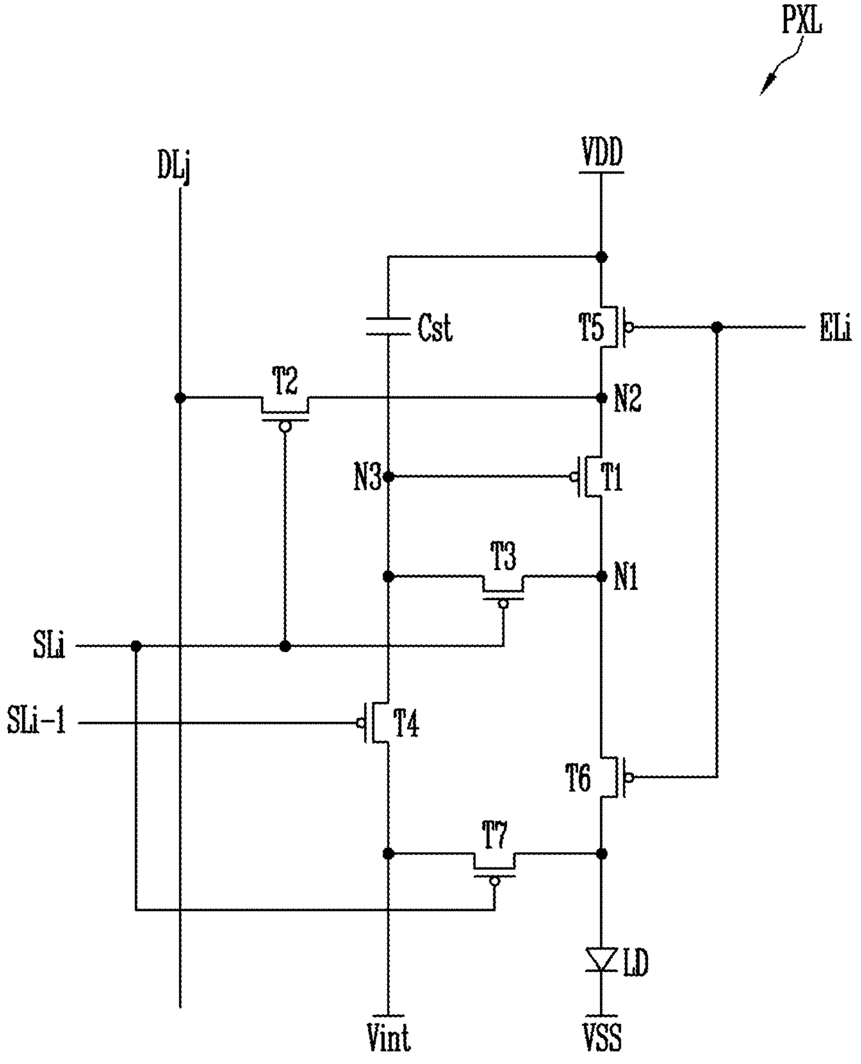
FIG. 12 is a diagram illustrating an example of a pixel included in the display device illustrated in FIG. 1.

FIG. 12 is a diagram illustrating an example of the pixel included in the display device illustrated in FIG. 1.

Referring to FIG. 12, the pixel PXL may include first to seventh transistors T1 to T7, a storage capacitor Cst, and a light emitting element LD.

Each of the first to seventh transistors T1 to T7 may be implemented as a P-type transistor, but embodiments of the present disclosure are not limited thereto. For example, at least some of the first to seventh transistors T1 to T7 may be implemented with an N-type transistor.

A first electrode of the first transistor T1 (driving transistor) may be connected to a second node N2, or be connected to a first power line (i.e., a power line to which the first power voltage VDD is applied) via the fifth transistor T5. A second electrode of the first transistor T1 may be connected to a first node N1, or be connected to an anode of the light emitting element LD via the sixth transistor T6. A gate electrode of the first transistor T1 may be connected to a third node N3. The first transistor T1 may control an amount of current flowing from the first power line to a second power line (i.e., a power line transferring the second power voltage VSS) via the light emitting element LD, corresponding to a voltage of the third node N3.

The second transistor T2 (switching transistor) may be connected to a jth data line DLj and the second node N2. A gate electrode of the second transistor T2 may be connected to an ith scan line SLi. The second transistor T2 may be turned on when a scan signal is supplied to the ith scan line SLi, to electrically connect the jth data line DLj and the first electrode of the first transistor T1 to each other.

The third transistor T3 may be connected between the first node N1 and the third node N3. A gate electrode of the third transistor T3 may be connected to the ith scan line SLi. The third transistor T3 may be turned on when the scan signal is supplied to the ith scan line SLi, to electrically connect the first node N1 and the third node N3 to each other. Therefore, when the third transistor T3 is turned on, the first transistor T1 may be connected in a diode form.

The storage capacitor Cst may be connected between the first power line and the third node N3. The storage capacitor Cst may store a voltage corresponding to a data signal and a threshold voltage of the first transistor T1.

The fourth transistor T4 may be connected between the third node N3 and an initialization power line (i.e., a power line transferring the initialization power voltage Vint). A gate electrode of the fourth transistor T4 may be connected to an (i−1)th scan line SLi−1 (or previous scan line). The fourth transistor T4 may be turned on when a scan signal is supplied to the (i−1)th scan line SLi−1, to supply the initialization power voltage Vint to the first node N1. The initialization power voltage Vint may be set to have a voltage level lower than a voltage level of the data signal.

The fifth transistor T5 may be connected between the first power line and the second node N2. A gate electrode of the fifth transistor T5 may be connected to an ith emission control line ELi. The fifth transistor T5 may be turned off when an emission control signal is supplied to the ith emission control line ELi, and be turned on in other cases.

The sixth transistor T6 may be connected between the first node N1 and the light emitting element LD. A gate electrode of the sixth transistor T6 may be connected to the ith emission control line ELi. The sixth transistor T6 may be turned off when the emission control signal is supplied to the ith emission control line ELi, and be turned on in other cases.

The seventh transistor T7 may be connected between the initialization power line and the anode of the light emitting element LD. A gate electrode of the seventh transistor T7 may be connected to the ith scan line SLi. The seventh transistor T7 may be turned on when the scan signal is supplied to the ith scan line SLi, supply the initialization power voltage Vint to the anode of the light emitting element LD.

The anode of the light emitting element LD may be connected to the first transistor T1 via the sixth transistor T6, and a cathode of the light emitting element LD may be connected to the second power line. The light emitting element LD may generate light with a predetermined luminance, corresponding to a current supplied from the first transistor T1. In order for the current to flow through the light emitting element LD, the first power voltage VDD may be set to have a voltage level higher than a voltage level of the second power voltage VSS.

In the display device and the method of driving the display device in accordance with the present disclosure, a third gamma lookup table is generated by linearly interpolating first and second gamma lookup tables which are predetermined with respect to two representative luminance values adjacent to an input luminance value and each includes gamma voltage values. An offset for the input luminance value may be calculated by sampling offsets predetermined with respect to a specific luminance section, based on the input luminance value, the third gamma lookup table may be compensated using the offset, and an input grayscale value may be converted into a data value (or gamma voltage value), based on the compensated third gamma lookup table (i.e., a fourth gamma lookup table). Thus, a more accurate data value (or gamma voltages corresponding thereto) corresponding to the input luminance value can be generated, and the display quality of the display device can be improved.

In some aspects, since only an offset with respect to a specific luminance section is selectively used without nonlinear computation, the size of hardware for compensating for the third gamma lookup table and the load of the display device can be minimized.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A display device comprising:

a display panel comprising a pixel;

a gamma voltage generator configured to generate gamma voltages; and a driver configured to:

convert a grayscale value of image data into a voltage value, using a gamma lookup table corresponding to an input luminance value, wherein:

the gamma lookup table comprises voltage values for a set of grayscale values among all grayscale values, and in association with converting the grayscale value into the voltage value, the driver is configured to calculate voltage values for all the grayscale values by nonlinearly interpolating the voltage values for the set of grayscale values, and provide the display panel with a data voltage corresponding to a gamma voltage among the gamma voltages, wherein the data voltage corresponds to the voltage value, wherein the driver is further configured to:

select a first gamma lookup table and a second gamma lookup table from among predetermined gamma lookup tables corresponding to representative luminance values, based on the input luminance value;

calculate a third gamma lookup table for the input luminance value by linearly interpolating the first gamma lookup table and the second gamma lookup table; and generate the gamma lookup table based on the third gamma lookup table, wherein generating the gamma lookup table comprises applying or refraining from applying an offset corresponding to the input luminance value to the third gamma lookup table.

2. The display device of claim 1, wherein a range of the input luminance value is divided into a plurality of luminance sections with respect to the representative luminance values, wherein offsets for first intermediate luminance values comprised in a first luminance section among the plurality of luminance sections are predetermined, and wherein the driver calculates the offset by applying the offsets to a second luminance section comprised among the plurality of luminance sections and to which the input luminance value belongs.

3. The display device of claim 2, wherein the offsets for the first intermediate luminance values have a nonlinear relationship with respect to the first intermediate luminance values, and wherein the offsets for the first intermediate luminance values are located on a multidimensional nonlinear curve.

4. The display device of claim 3, wherein, for an intermediate luminance value among the first intermediate luminance values comprised in the first luminance section, a size of an offset for the intermediate luminance value increases as a distance between the intermediate luminance value and a boundary of the first luminance section increases.

5. The display device of claim 3, wherein the driver is configured to:

sample the multidimensional nonlinear curve such that a first quantity of the first intermediate luminance values in the first luminance section corresponds to a second quantity of second intermediate luminance values in the second luminance section to which the input luminance value belongs; and acquire the offset corresponding to the input luminance value from a sampling result associated with sampling the multidimensional nonlinear curve.

6. The display device of claim 3, wherein a gain is predetermined for each luminance section of the plurality of luminance sections, and wherein the driver is configured to:

correct a height of the multidimensional nonlinear curve, using the gain of the second luminance section to which the input luminance value belongs; and acquire the offset corresponding to the input luminance value by sampling the corrected multidimensional nonlinear curve.

7. The display device of claim 6, wherein the gain further comprises a sub-gain for each grayscale, and wherein the driver generates the gamma lookup table by applying a sub-offset for each grayscale to a corresponding voltage value in the third gamma lookup table, using the sub-gain.

8. The display device of claim 2, further comprising:

an emission driver configured to adjust an emission time parameter of the pixel in a frame, based on whether the input luminance value is in a partial luminance section among the plurality of luminance sections, wherein the driver is configured to:

convert the grayscale value into the voltage value, using the gamma lookup table, when the input luminance value is in the partial luminance section, and convert the grayscale value into the voltage value, using the third gamma lookup table, when the input luminance value is out of the partial luminance section.

9. The display device of claim 2, wherein the driver is configured to acquire the offset corresponding to the input luminance value, using offsets of the first luminance section among the plurality of luminance sections.

10. The display device of claim 1, wherein the driver is configured to generate the gamma lookup table by adding the offset to a voltage value comprised in the third gamma lookup table.

11. A method of driving a display device, the method comprising:

selecting a first gamma lookup table and a second gamma lookup table from among predetermined gamma lookup tables corresponding to representative luminance values as some of all luminance values, based on an input luminance value of a display panel;

calculating a third gamma lookup table for the input luminance value by linearly interpolating the first gamma lookup table and the second gamma lookup table;

generating a fourth gamma lookup table based on the third gamma lookup table, wherein generating the fourth gamma lookup table comprises applying or refraining from applying an offset corresponding to the input luminance value to the third gamma lookup table;

converting a grayscale value of image data into a voltage value, using the fourth gamma lookup table, wherein the converting of the grayscale value into the voltage value comprises converting the grayscale value into the voltage value, using the fourth gamma lookup table, in response to the input luminance value being smaller than a reference luminance value; and providing the display panel with a data voltage corresponding to a gamma voltage among gamma voltages generated by a gamma voltage generator, wherein the data voltage corresponds to the voltage value.

12. The method of claim 11, wherein a range of the input luminance value is divided into a plurality of luminance sections with respect to the representative luminance values, wherein offsets for first intermediate luminance values comprised in a first luminance section among the plurality of luminance sections are predetermined, and wherein the generating of the fourth gamma lookup table comprises calculating the offset by applying the offsets to a second luminance section comprised among the plurality of luminance sections and to which the input luminance value belongs.

13. The method of claim 12, wherein the offsets for the first intermediate luminance values have a nonlinear relationship with respect to the first intermediate luminance values, and wherein the offsets for the first intermediate luminance values are located on a multidimensional nonlinear curve.

14. The method of claim 13, wherein the calculating of the offset further comprises:

sampling the multidimensional nonlinear curve such that a first quantity of the first intermediate luminance values in the first luminance section corresponds to a second quantity of second intermediate luminance values in the second luminance section to which the input luminance value belongs; and acquiring the offset corresponding to the input luminance value from a sampling result associated with the sampling of the multidimensional nonlinear curve.

15. The method of claim 14, wherein the generating of the fourth gamma lookup table comprises adding the offset to a voltage value comprised in the third gamma lookup table.

16. The method of claim 14, wherein the fourth gamma lookup table comprises voltage values for a set of grayscale values among all grayscale values, and wherein the converting of the grayscale value into the voltage value comprises calculating voltage values for all the grayscale values by nonlinearly interpolating the voltage values for the set of grayscale values.

17. The method of claim 13, wherein a gain is predetermined for each luminance section of the plurality of luminance sections, wherein the calculating of the offset further comprises sampling the multidimensional nonlinear curve, wherein the sampling of the multidimensional nonlinear curve comprises correcting a height of the multidimensional nonlinear curve, using the gain of the second luminance section to which the input luminance value belongs, and wherein the method further comprises acquiring the offset corresponding to the input luminance value by sampling the corrected multidimensional nonlinear curve.

18. The method of claim 17, wherein the gain further comprises a sub-gain for each grayscale, and wherein the generating of the fourth gamma lookup table further comprises applying a sub-offset for each grayscale to a corresponding voltage value in the third gamma lookup table, using the sub-gain.

19. A display device comprising:

a display panel comprising a pixel;

a gamma voltage generator configured to generate gamma voltages; and a driver configured to:

convert a grayscale value of image data into a voltage value, using a gamma lookup table corresponding to an input luminance value, and provide the display panel with a data voltage corresponding to a gamma voltage among the gamma voltages, wherein the data voltage corresponds to the voltage value, wherein the driver is further configured to:

select a first gamma lookup table and a second gamma lookup table from among predetermined gamma lookup tables corresponding to representative luminance values, based on the input luminance value, wherein:

a range of the input luminance value is divided into a plurality of luminance sections with respect to the representative luminance values; and offsets for first intermediate luminance values comprised in a first luminance section among the plurality of luminance sections are predetermined, have a nonlinear relationship with respect to the first intermediate luminance values, and are located on a multidimensional nonlinear curve;

calculate a third gamma lookup table for the input luminance value by linearly interpolating the first gamma lookup table and the second gamma lookup table;

calculate an offset corresponding to the input luminance value by applying the offsets to a second luminance section comprised among the plurality of luminance sections and to which the input luminance value belongs; and generate the gamma lookup table based on the third gamma lookup table, wherein generating the gamma lookup table comprises applying or refraining from applying the offset corresponding to the input luminance value to the third gamma lookup table.

* * * * *